United States Patent Office 3,126,354
Patented Mar. 24, 1964

3,126,354
METHOD OF IMPREGNATING POLYSTYRENE BEADS WITH BUTANE IN A NON-AQUEOUS ENVIRONMENT TO RENDER SAID BEADS FOAMABLE
Stewart T. Day, Fort Worth, Tex., assignor to Crown Machine & Tool Company, Inc., Fort Worth, Tex., a corporation of Texas
No Drawing. Filed Jan. 2, 1963, Ser. No. 248,907
8 Claims. (Cl. 260—2.5)

This invention is concerned with a method for preparing expandable plastic bead material for use as a molding medium. It more specifically concerns a new and improved method for impregnating general purpose polystyrene beads and polystyrene bead materials with a dry gas in a substantially non-aqueous environment.

This invention is a continuation-in-part of my copending application Serial No. 89,618, filed February 16, 1961.

A primary object of this invention is to provide a method for quickly and safely impregnating plastic material such as general purpose polystyrene beads and polystyrene bead materials with an expandable gas.

Another object is a method of impregnating plastic bead materials at generally room temperatures and in a generally dry or non-aqueous medium.

Another object is a method for impregnating plastic bead materials which require fewer steps to obtain the impregnated product.

Another object is the reduction of the manipulative steps in impregnating plastic bead materials to thereby markedly reduce the possibility of static sparks exploding the combustible impregnating agent.

Another object is a method for impregnating polystyrene bead materials without requiring violent agitaion for the polystyrene beads and the impregnating medium.

Another object is a method for impregnating polystyrene bead materials without the disadvantage of clumping or sticking together of the beads.

Another object is a simple and safe method for impregnating special polystyrene material such as polystyrene combined with butadiene-styrene (GR-S) rubber to obtain the advantageous features of this impregnated product.

Such objects are now realized along with other objects which will become apparent from reading the following specification and claims.

No drawings are included in the application because the nature of the invention does not lend itself to a graphic description.

General purpose polystyrene beads are impregnated in this method by first placing such beads in a pressure zone which may be an air-tight drum container. The container may be of various sizes to hold different amounts of a charge of polystyrene bead materials. By the term "polystyrene bead materials," I mean general purpose polystyrene beads or various polystyrene bead products such as a mixture of polystyrene and butadiene-styrene synthetic rubber, more often referred to as GR-S or Government Rubber Type S. This will be described in more detail later.

The general purpose polystyrene bead material, say 100 pounds, is placed in a large drum tumbler. An excess amount, by weight, of dry butane is then pumped into the container under positive pressure. By "excess" amount, I mean additional butane over the amount required for a desired impregnation level. The additional amount is added to purge all the air from the container. For example, a required amount of butane will be added to obtain an impregnated bead product having 7 percent by weight of butane, and then an additional amount of butane is added to purge all the air from the container.

The atmosphere in which the bead charge is placed is completely dry, no aqueous or liquid medium being added to the drum tumbler. Impregnation is accomplished over a period of approximately 24 hours as the tumbler rotates and the general purpose polystyrene beads are impregnated by the butane. Following this period, valves on the drum container are opened to release the excess butane, and the beads are then removed and transferred to another container to store the beads for a period of 3–5 days at normal room temperatures. The storage container may be an air-tight pressure container or it may be a standard fiber container.

The tumbling in the air-tight or pressure container may be carried out for longer or shorter periods than 24 hours, but it has been found that this period is effective to produce beads having a proper gas impregnation. The storage period is conventional in order to obtain fine beads of uniform cell size. After the initial tumbling period, the impregnated beads may be quickly and easily transferred to the storage container because no further agitation is necessary. There is no need to perform special steps for separating, washing and drying the beads. These fewer manipulative steps reduce the possibility of static sparks causing an explosion or firing of the combustible impregnating medium or agent. The non-aqueous dry environment prevents the beads from clumping; therefore, they may be transferred to the storage container as a free-flowing material.

Another polystyrene bead product may be prepared by physically mixing polystyrene beads with small particles of butadiene-styrene or GR-S rubber. The polystyrene and GRS may be also combined by polymerizing both materials according to conventional steps. The physical mixture is preferably obtained by mixing GR-S with polystyrene, and extruding the mixture to form a bead material which is an intimate mixture of polystyrene and GR-S.

The combination of polystyrene and GR-S has been found to be a desired product because greater amounts of impregnating agents are absorbed.

It has been found that a copolymer obtained by obtaining 2–15 percent GR-S and 98–85 percent polystyrene leads to an excellent product when impregnated by dry butane in a non-aqueous environment according to this process. Copolymers made from 92 percent polystyrene and 8 percent GR-S have been successfully impregnated by dry butane in the substantially non-aqueous environment of the present process.

Such a copolymer is again placed in an airtight drum tumbler and an appropriate amount of dry butane is added thereto under positive pressure. An excess amount of butane is added to obtain an impregnated bead product having about 7 percent by weight of impregnated butane, and to purge the container of air. Again, the butane is dry and the impregnating environment is substantially non-aqueous because liquid agents as such are not added. Impregnation is again accomplished over a period of about 24 hours. The impregnated beads are transferred in a free-flowing state to a fiber container for storage where they are stored for about 3–5 days at normal or room temperatures. Such polystyrene-GR-S beads have a shelf life of about 15–20 days. The beads retain a great portion of their impregnated gases and do not lose more than a small amount of their subsequent foaming capabilities. The prefoam life of such beads is approximately 3 days. By this, I mean that after an initial foaming temperature, for example, 190 degrees F., is applied, the prefoam charge will retain a critical amount of the impregnated gas for approximately 3 days.

Such impregnated beads may then be used for various molding operations, as, for example, forming plastic containers with low thermoconductivity or excellent insulating properties.

The present process permits the use of simple equipment and simple process steps to provide an impregnated bead product having a desired level of expanding agent. The use of the dry butane impregnating agent and the non-aqueous environment permits the bead material to be impregnated without the disadvantages associated with prior wet impregnating agents. With my process, there is no need to centrifuge the beads in a liquid medium, there is no need to decant or pour off the liquid impregnating agent, and there is no need to wash the beads after they have been impregnated. It will likewise be seen that such beads do not have to be dried after impregnation. The disadvantage of possible fire and explosion has also been eliminated. Such manipulative steps greatly increase the possibility of static sparks occurring which would immediately explode or fire the combustible impregnating agent.

The advantages of the process are realized no matter what polystyrene bead material is used for impregnation. While general purpose polystyrene beads are frequently used, other types of polystyrene bead materials may be used to realize the advantages of this process. Such a bead material may be the combination, by mixture or polymerization, of polystyrene and GR-S rubber. The polystyrene and GR-S rubber combination prepared quickly and safely by this process may be stored in an unfoamed state for long periods of time, which may be 15–20 days. These beads may be prefoamed at lower temperature to partially expand them, and such prefoamed beads will maintain their ability to foam at higher temperatures for about 3 days.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A method of making a foamable polystyrene bead material for use as a molding medium which includes the steps of placing a selected charge of polystyrene bead material in a substantially gas-tight container, providing a substantially non-aqueous environment in the container, adding to the container a predetermined amount by weight of dry butane under positive pressure so that the bead material will be impregnated to a selected level and agitating the container to commingle the bead material and the butane in the substantially non-aqueous environment.

2. The method of claim 1 further characterized in that the polystyrene bead material is general purpose polystyrene.

3. The method according to claim 1 further characterized in that the polystyrene bead material is polystyrene combined with butadiene-styrene rubber.

4. A method of making a foamable polystyrene bead material for use as a molding medium which includes the steps of placing a selected charge of polystyrene bead material in a substantially gas-tight container, providing a substantially non-aqueous environment in the container, adding to the container a predetermined amount by weight of dry butane gas under positive pressure so that the bead material will be impregnated to a selected level, placing additional dry butane in the container to purge all the air, and agitating the container to commingle the plastic bead material and the butane gas in the substantially non-aqueous environment at substantially room temperature.

5. The method of claim 4 further characterized in that the polystyrene bead material is general purpose styrene.

6. The method of claim 4 further characterized in that the polystyrene bead material is polystyrene combined with butadiene-styrene rubber.

7. A method of making a foamable polystyrene bead material for use as a molding medium which includes the steps of polymerizing polystyrene with butadiene-styrene rubber, reducing the polymerized product to beaded material, charging a substantially gas-tight container with a selected weight of the plastic bead material, providing a substantially non-aqueous environment in the container, adding to the container a predetermined amount by weight of dry butane gas under positive pressure so that the bead material will be impregnated to a selected level, placing additional dry butane in the container to purge all the air, and agitating the container to commingle the plastic bead material and the butane gas in the substantially non-aqueous environment at substantially room temperature.

8. A method of making a foamable polystyrene bead material for use as a molding medium which includes the steps of combining about 85–98 percent polystyrene plastic with about 15–2 percent of butadiene-styrene rubber, reducing the combined product to a fine bead material, charging a substantially gas-tight container with a selected weight of the plastic bead material, providing a substantially non-aqueous environment in the container, adding to the container a predetermined amount by weight of the dry butane gas under positive pressure so that the bead material will be impregnated to a selected level, placing additional dry butane in the container to purge all the air, agitating the container to commingle the plastic bead material with the dry butane gas in the substantially non-aqueous environment, and agitating the container to commingle the plastic bead material and the butane gas in the substantially non-aqueous environment at substantially room temperature.

References Cited in the file of this patent

UNITED STATES PATENTS 3,001,954 Buchholtz _____ Sept. 26, 1961